United States Patent [19]

Love

[11] Patent Number: 5,076,111
[45] Date of Patent: Dec. 31, 1991

[54] MODULAR DRIVE AXLE HAVING A THREE-SPEED TRANSMISSION

[75] Inventor: Mahlon L. Love, Geneseo, Ill.

[73] Assignee: Deere & Company, Moline, Ill.

[21] Appl. No.: 525,367

[22] Filed: May 17, 1990

[51] Int. Cl.⁵ .................... F16H 3/08; F16H 55/08
[52] U.S. Cl. .................................. 74/331; 74/462; 74/372
[58] Field of Search ............ 74/331, 371, 372, 377, 74/462; 475/200, 206, 221, 231

[56] References Cited

U.S. PATENT DOCUMENTS

| | | | |
|---|---|---|---|
| 1,390,414 | 9/1921 | Wingqvist | 74/462 |
| 1,820,246 | 8/1931 | Preis | 74/462 |
| 2,400,540 | 5/1946 | Chilton | 74/371 |
| 2,709,927 | 6/1955 | Van Meter | 475/231 |
| 2,796,942 | 6/1957 | Hill | 475/200 X |
| 3,354,738 | 11/1967 | Ivanchich | 74/331 X |
| 3,354,739 | 11/1967 | Ivanchich | 74/372 X |
| 3,362,244 | 1/1968 | Ivanchich | 74/372 X |
| 3,367,462 | 2/1968 | Bibbens | 74/462 X |
| 3,399,580 | 9/1968 | Ivanchich | 74/331 |
| 3,600,962 | 8/1971 | Ivanchich | 74/371 X |
| 3,611,823 | 10/1971 | Richards | 74/331 |
| 3,636,791 | 1/1972 | Barr | 74/462 X |
| 3,718,052 | 2/1973 | Barr et al. | 74/462 |
| 3,799,002 | 3/1974 | Richards | 74/372 X |
| 4,083,419 | 4/1978 | Fogelberg | 475/221 X |
| 4,308,760 | 1/1982 | Voigtländer et al. | 74/462 X |
| 4,552,030 | 11/1985 | Szecsei | 74/462 |
| 4,650,202 | 3/1987 | Tsuzuki | 475/221 X |
| 4,732,053 | 3/1988 | Gleasman et al. | 475/221 X |

FOREIGN PATENT DOCUMENTS 347104 11/1920 Fed. Rep. of Germany ........ 74/462

Primary Examiner—Richard Lorence
Assistant Examiner—David E. Henn

[57] ABSTRACT

A modular drive axle having left and right drive wheels and axles that are coupled to a differential. The left and right axles are in line and define a transverse axis. A bevel gear assembly having first and second bevel gears mounted on a drive shaft directs rotary motion from a transmission to the differential for driving the drive wheels. The bevel gear assembly drive shaft is perpendicular to the transverse axis and the transmission which is operatively coupled to the bevel gear assembly and arranged parallel to the transverse axis. The transmission is a collar shift transmission having an input collar with two output surfaces. The first output surface of the input collar drives a fixed countershaft gear having first and second output surfaces. The first and second output surfaces drive first and second intermediate gears. A gear selector collar is slidably positioned on a drive shaft and selectively engages either the first intermediate gear, the second intermediate gear, or the second output surface of the input collar. The selector collar is provided with bi-directional self centering surfaces.

8 Claims, 4 Drawing Sheets

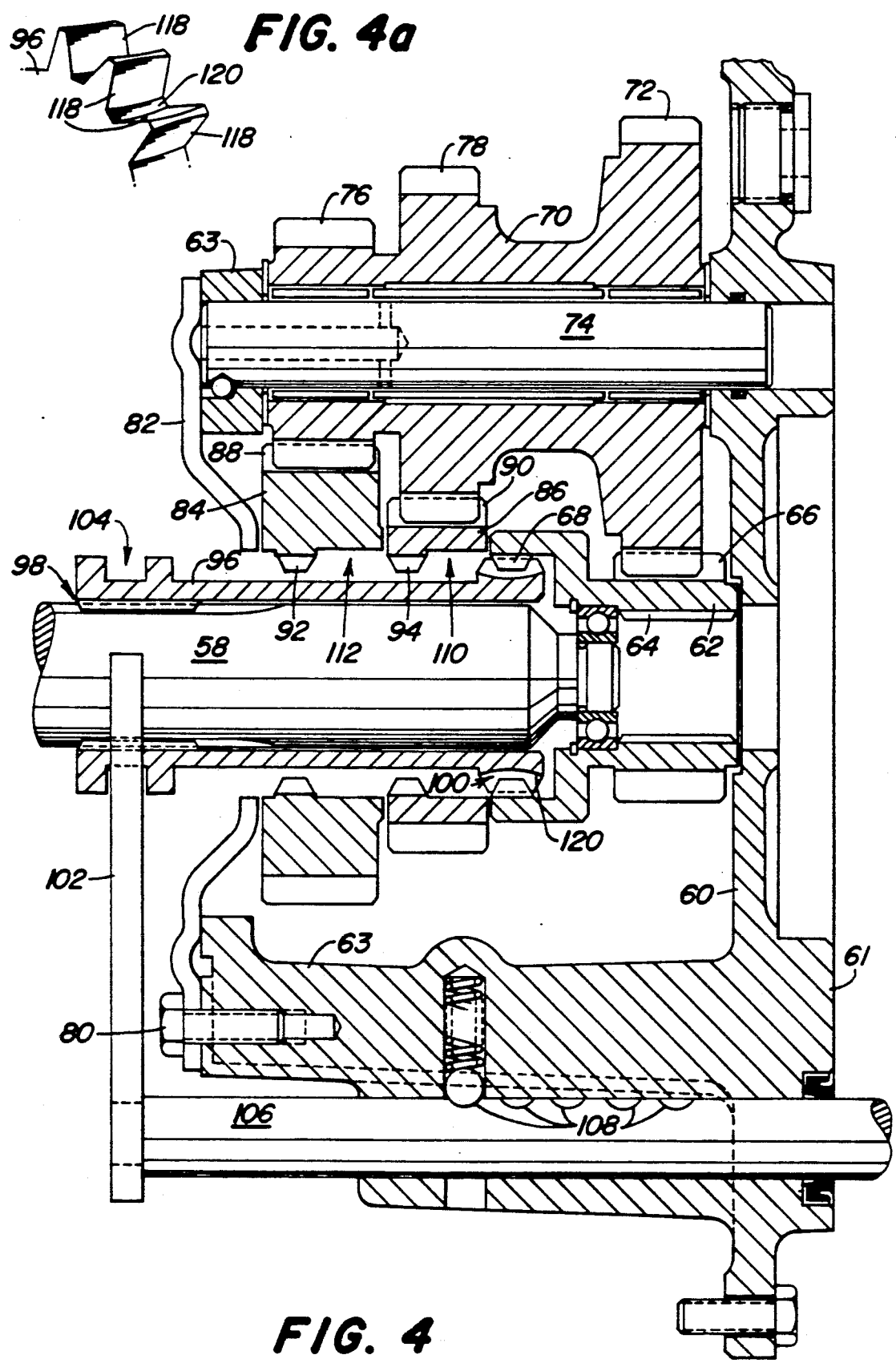

MODULAR DRIVE AXLE HAVING A THREE-SPEED TRANSMISSION

BACKGROUND OF THE INVENTION

1. Field of the Invention

The invention is directed to a modular drive axle having a sliding gear transmission.

2. Description of the Prior Art

A conventional power train for a work vehicle comprises a prime mover or internal combustion engine applying rotary motion to a main clutch. The main clutch engages a transmission which manipulates the speed of the rotary motion. The transmission in turn is coupled to a differential which applies the rotary motion to right and left axles. The axles are provided with final drives for driving wheels that propel the vehicle. In work vehicles the final drives may comprise planetary reduction units.

Hydrostatic drive systems provide an infinitely variable method of adjusting the speed of the final drives. In a hydrostatic drive system the internal combustion engine drives a fluid pump which supplies fluid to a fluid motor. The motor in turn is operatively coupled to the final drives for driving the vehicle. The pumping unit can be a reversible variable displacement pump, so that the operator by adjusting the position of the swash plate can drive the vehicle at any speed over a specified range, in forward or reverse.

The hydrostatic drive only operates efficiently over a limited speed range, as such shiftable transmissions have been added between the hydrostatic motor and the final drives to increase the efficient range of the hydrostatic unit. More specifically, on combines the hydrostatic units have been provided with four-speed transmissions to increase the effective speed range of the combine.

One type of mechanical transmission is the collar shift transmission. The collar shift transmission has parallel shafts with gears in constant mesh. In neutral, the gears are free-running but when shifted, they are locked to their shafts by sliding collars. When a gear is engaged, it is secured to its shaft by a collar or coupling device. The gear is disengaged when the collar is released and the gear turns freely again.

To insure that the gears are correctly held in place, it is known to angle the side surface of the gear tooth and the root of the sliding gear so that the gear is biassed against a stop during rotation. It has been found that the canted surfaces need be only five to seven degrees.

BRIEF DESCRIPTION OF THE DRAWINGS

FIG. 4 is a cross sectional view of the transmission.

FIG. 4a is a fragmentary perspective view of the selector collar.

SUMMARY

It is an object of the present invention to provide a modular and compact drive axle for a work vehicle.

It is another object of the present invention to provide a compact collar shift transmission.

It is a feature of this transmission that it is provided with a self-centering collar.

The present invention comprises a drive axle having left and right wheels that are provided with planetary reduction units. The planetary reduction units are coupled to left and right axles that are coupled at their other end to a differential. The left and right axles define a transverse axis. The input to the differential is perpendicular to transverse axis and comprises a drive shaft having two bevel gear surfaces. The first bevel gear is coupled to the differential whereas the second bevel gear is driven by a collar shift transmission The collar shift transmission is arranged parallel to the transverse axis and in turn is driven by a hydraulic motor. The bevel gear drive shaft is also provided with an output assembly in line with the drive shaft which is coupled to an emergency brake.

The collar shift transmission of the present invention comprises an input collar having two output surfaces. The first output surface of the input collar is used to drive three stationary countershaft gears arranged radially about the input collar. The countershaft gears are mounted to three fixed and parallel countershafts and are each provided with two output surfaces. Each of the two output surfaces of the countershaft gears drive two independent intermediate gears that are concentrically arranged around an output drive shaft. A gear selector collar is selectively positioned on the output shaft and can be selectively positioned to engage the second output surface of the input collar, the first intermediate gear, or the second intermediate gear. Neutral positions are provided by first and second spaces that are formed between the second output surface of the input collar and the second intermediate gear; and the second intermediate gear and the first intermediate gear, respectively.

To insure that the selector collar is properly positioned in relation to one of the intermediate gears or the second output surface of the input collar, the gear selector sleeve is provided with the self centering surfaces. The self centering surface comprises concave gear teeth sidewalls and an axially concave root on the gear selector collar.

DETAILED DESCRIPTION

Figure 1:
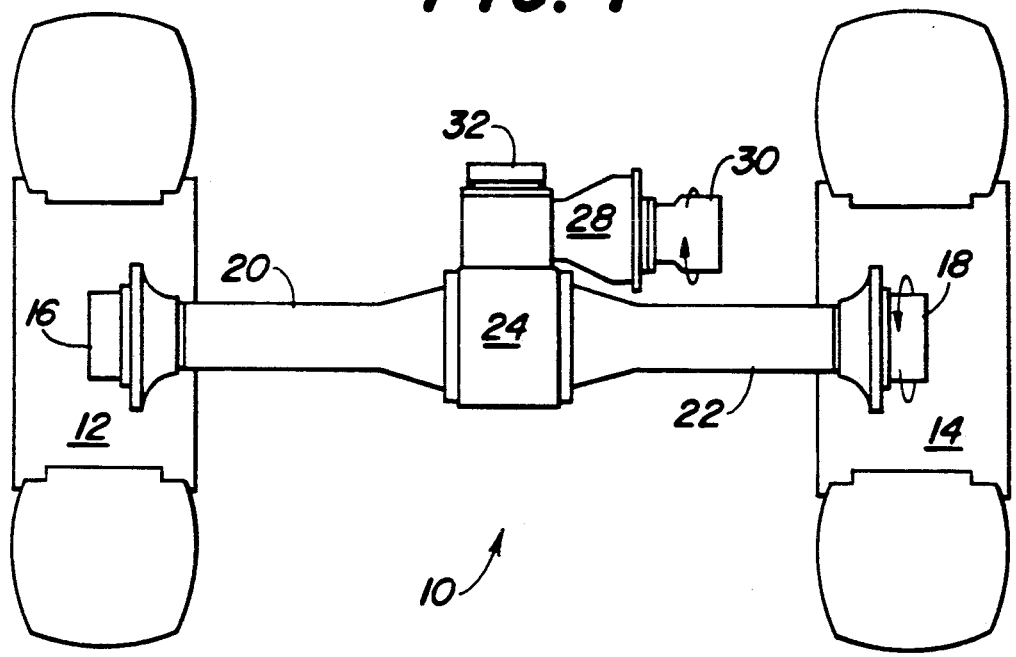
FIG. 1 is top view of a drive axle of the present invention.

FIG. 1 illustrates a modular drive axle for a work vehicle. The drive axle 10 comprises left and right wheels 12 and 14 respectively that are coupled to left and right planetary reduction units 16 and 18. The planetary reduction units in turn are coupled to left and right axles 20 and 22 which are joined together at differential 24. The left and right axles define a transverse axis that passes through the differential. A bevel drive shaft 26, best illustrated in FIG. 2, drives the differential and is arranged perpendicular to the transverse axis. Collar shift transmission 28 is also coupled to the bevel drive shaft and is arranged parallel to the transverse axis. Hydraulic motor 30 drives the transmission and in turn the bevel drive shaft, the differential, the left and right axles, and the left and right drive wheels. The bevel drive shaft is also provided with an in line output assembly which is coupled to emergency brake 32.

Figure 3:
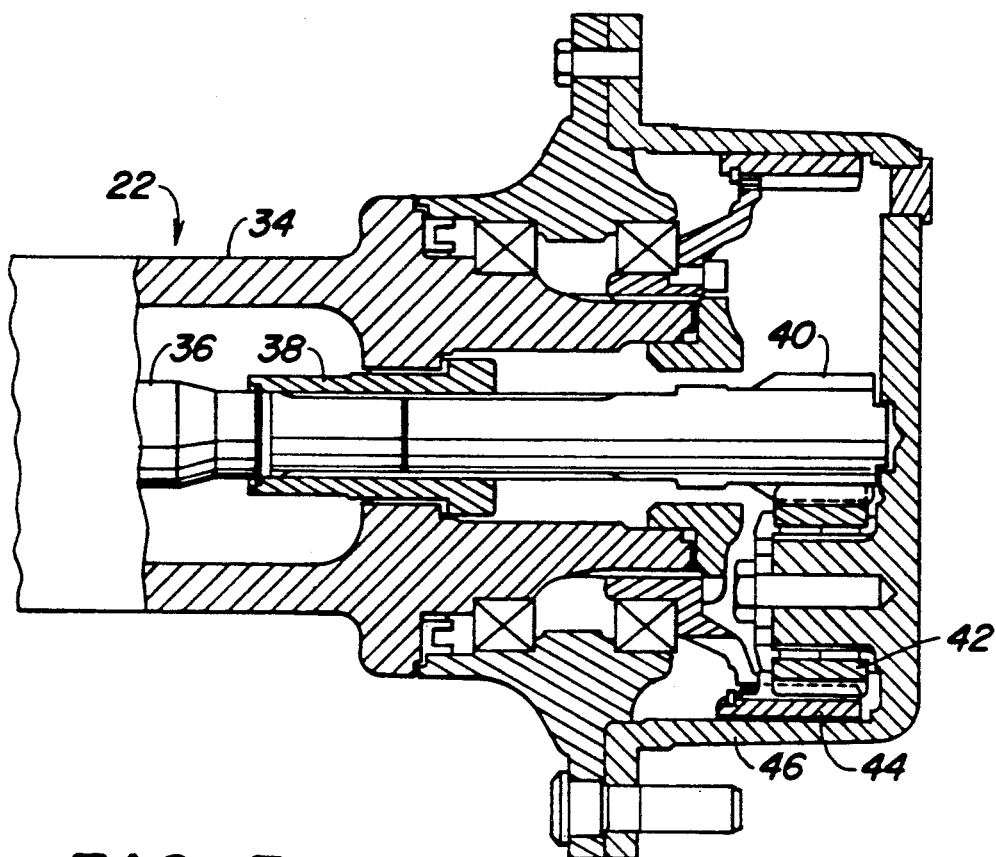
FIGS. 2-3 are a cross sectional view of the modular drive axle.
Figure 2:
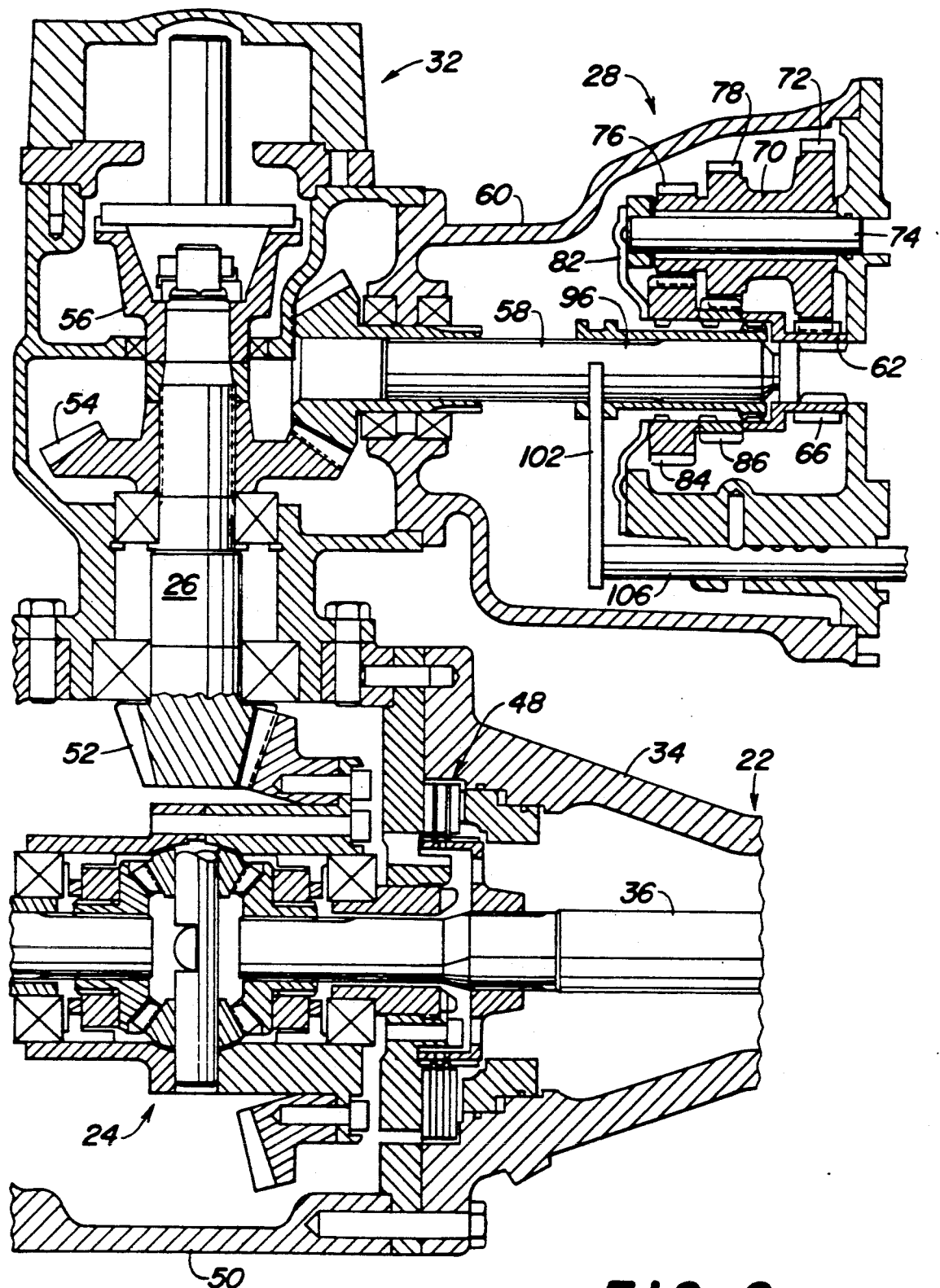

FIGS. 2 and 3 are cross sectional views of the modular axle assembly. FIG. 3 is a partial cross sectional view of right axle 22 having axle housing 34 and drive axle 36. Drive axle 36 is provided with a bearing collar 38 and external splines 40 which drive three planetary gears 42, only one shown. The planetary gears in turn drive ring gear 44 which is fixably mounted to wheel flange 46 for driving right wheel 14. The left planetary reduction unit is identical to the right planetary reduction unit. Both of these planetary reduction units are convention and are well known in the art.

Right drive axle 36 is coupled at its other end to differential 24. It is also provided with hydraulic brake 48 located immediately outside of the differential housing. The left drive axle has a similar hydraulic brake. The differential and the hydraulic brake assembly are of well known configurations. The differential is modular in nature so that different differential assemblies may be slipped into and out of differential housing 50. For example, a standard differential, a limited slip differential, or an anti-spin differential could be inserted into the differential housing 50.

The differential is driven by perpendicular bevel drive shaft 26 having a first bevel gear surface 52 and a second bevel gear surface 54. The bevel gear drive shaft is also provided with an in line output assembly 56. The first bevel gear surface 52 is used to drive the differential 24. Whereas, the second bevel gear surface 54 is driven by transmission 28. The in line output assembly 56 is coupled to emergency brake 32. Emergency brake 32 is also of a conventional configuration well known in the art.

Figure 5:
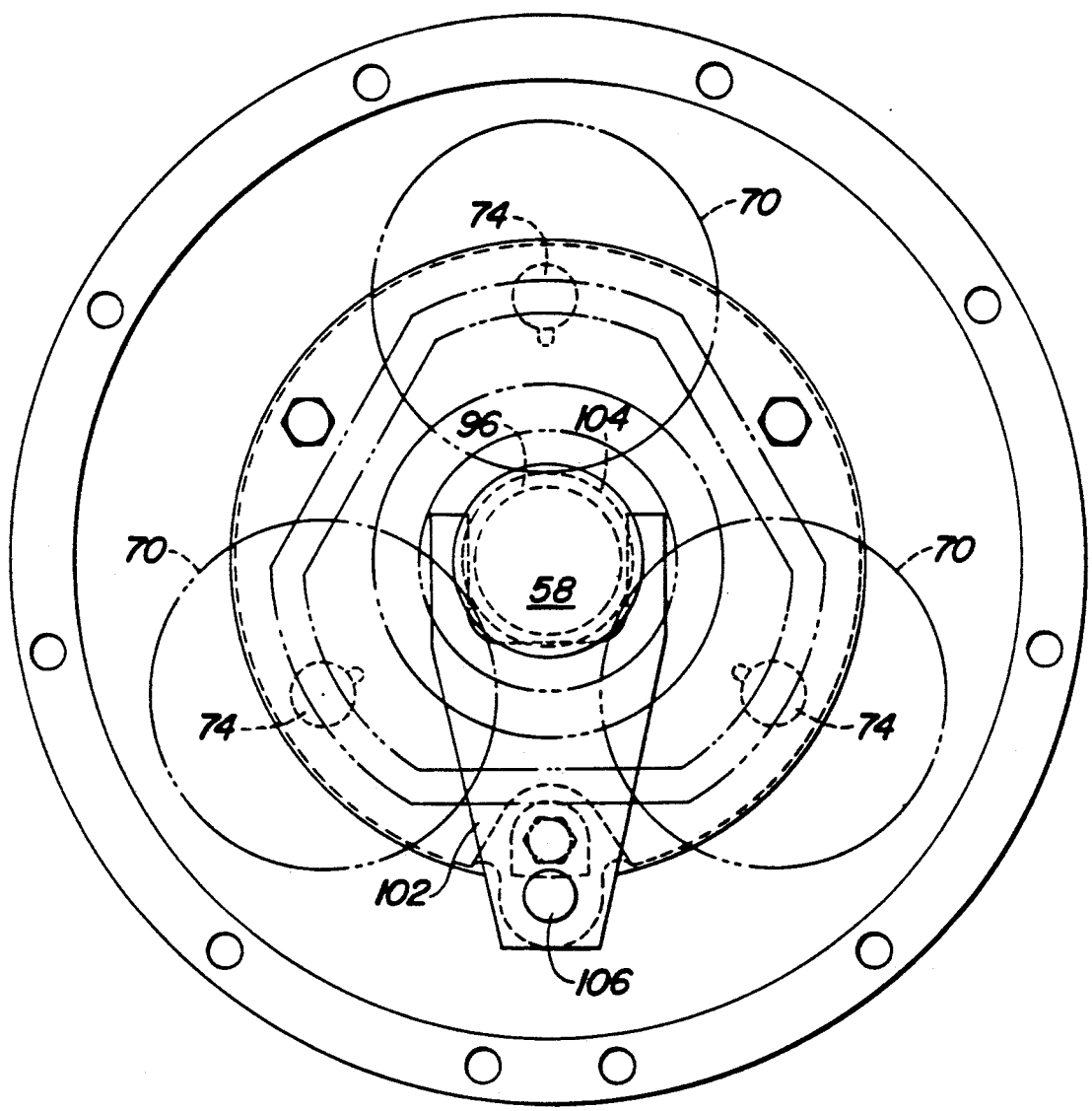
FIG. 5 an end view of the three-speed transmission used in the drive axle.

The second bevel gear surface is driven by output drive shaft 58 of transmission 28. The transmission is located in housing 60 and has three speeds. The transmission itself is best illustrated in FIG. 4. The transmission comprises an input means formed by input collar 62 having internal splines 64 which are coupled to the output shaft of a hydraulic motor 30. The input collar is also provided with a first output surface 66 and a second output surface 68. The first output surface 66 drives a transfer means comprising three radially arranged countershaft gears 70 (only one shown), having an input surface 72 that cooperates with the first output surface 66. The three radially arranged countershaft gears, as illustrated in FIG. 5, are rotatably mounted on countershafts 74 which extend parallel to output drive shaft 58. Each of the countershaft gears are provided with first and second output surfaces 76 and 78, respectively. Housing 60 is provided with base portion 61 having inwardly projecting portions 63. Base portion 61 together with inwardly projecting portions 63 form mounting assemblies for the three countershafts. Annular holding plate 82 is mounted to portions 63 by bolts 80.

The first and second output surfaces 76 and 78 of countershaft gear 70 are used to drive independent first and second intermediate gears 84 and 86, having input surfaces 88 and 90 respectively. Intermediate gears 84 and 86 are concentrically arranged around drive shaft 58 and are held in place by the three radially arranged countershaft gears and holding plate 82. First intermediate gear 84 is provided with output surface 92, and second intermediate gear 86 is provided with output surface 94.

Slidably positioned on drive shaft 58 is a gear selection means comprising gear selector collar 96. Gear selector collar 96 transmits rotary motion to drive shaft 58 through cooperating splines 98. The selector collar is provided with an input surface 100 which is selectively coupled to second output surface 68 of input collar 62, output surface 94 of second intermediate gear 86 and output surface 92 of first intermediate gear 84. The selector collar is slidably positioned on output shaft 58 by fork 102 cooperating with channel 104 formed on the selector collar. The fork is slidably positioned by rod 106 having bearing detents 108 identifying the gear shift positions of the transmission. Rod 106 can be manipulated by any suitable linkage.

The two intermediate gears and the second output surface of the input collar defines three different output speeds of the transmission. By selectively engaging each of these output surfaces, the output speed of the drive shaft 58 is changed relative to the input speed of the hydraulic motor. First and second neutral spaces are formed between the output surfaces. More specifically, a first neutral space 110 is formed between output surface 94 and second output gear surface 68 of the input collar. A second neutral space 112 is formed between output gear surface 94 and output gear surface 92. In these neutral spaces input surface 100 of the selector collar is no longer driven by the hydraulic motor.

As illustrated in FIG. 4a, input surface 100 of selector collar 90 is provided with a plurality of radially outwardly extending teeth. Each tooth is provided with two concave sidewalls 118 which act to center the input surface 100 of the selector collar into mesh with the output surfaces. In addition, root 120 is also axially concave having an axially concave root configuration 120. These concave surfaces act as bi-directional self-centering surfaces. By having these concave surfaces, the selector collar tends to center on the output surfaces.

It is desirable that the hydraulic motor 30 be driven by a reversible variable displacement pump, not shown, so that there is an infinite range of speed selections in each gear shift and the motor can be readily reversed without requiring a reversing gear for the transmission.

The present invention provides a compact modular drive axle assembly having an infinite range of speeds. The transmission mounted to the drive axle is simple and rugged and provides a compact unit for the axle.

The present invention should not be limited by the above described embodiment, but should be limited solely by the claims that followed.

I claim:

1. A transmission comprising:
an input means for receiving rotary motion, the input means having a first output surface;
an output means for transmitting rotary motion to a work assembly, the output means comprising a drive shaft;
a transfer means for transferring the rotary motion from the input means to the output means, the transfer means having three radially arranged countershaft gears and two intermediate gears, each countershaft gear has first and second output surfaces and an input surface, the first output surface is operatively coupled to the first intermediate gear, the second output surface is operatively coupled to the second intermediate gear, and the input surface is operatively coupled to the first output surface of the input means, the first countershaft output surface and the first intermediate gear drive the output means at a first speed, and the second countershaft output surface and the second intermediate gear drive the output means at a second speed; and
gear selection means operatively coupled to the output means and selectively coupled to the first and second intermediate gears for selectively coupling the first and second intermediate gears to the output means for transmitting a rotary motion from the input means through the transfer means to the output means, the gear selection means comprises a selector collar slidably positioned on the drive shaft, both the drive shaft and the selector collar have cooperating splines for transmitting rotary motion between the selector collar and the drive shaft, the selector collar is provided with an input surface which selectively cooperates with the first and second intermediate gears, the input surface of the selector collar is provided with a self centering surface means for biassing the selector sleeve into centered engagement with one of the intermediate gears.

2. A transmission as defined by claim 1 wherein the input surface of the selector collar comprises a plurality of radially outwardly extending teeth each tooth having a concave side surface and intervening inwardly extending concave roots, the self centering surface means for comprises these concave surfaces.

3. A transmission comprising:
an input means for receiving rotary motion, the input means having a first output surface and a second output surface;
an output means for transmitting rotary motion to a work assembly, the output means comprising a drive shaft;
a transfer means for transferring rotary motion from the input means to the output means, the transfer means having a countershaft gear and at least one intermediate gear, the countershaft gear is provided with a first output surface and an input surface, the first output surface is operatively coupled to the intermediate gear, the input surface is operatively coupled to the first output surface of the input means, the intermediate gear drives the output means at a first speed and the input means drives the output means at a second speed; and
gear selection means operatively coupled to the output means and selectively coupled to the intermediate gear and the second output surface of the input means for selectively coupling the intermediate gear and the input means to the output means for transmitting rotary motion from the input means through the transfer means to the output means, the gear selection means comprises a selector collar slidably positioned on the drive shaft, both the drive shaft and the selector collar have cooperating splines for transmitting rotation between the selector collar and the drive shaft, the selector collar is provided with an input surface which selectively cooperates with the intermediate gear and the second output surface of the input means, the input surface of the selector collar is provided with a self centering surfaces means for biassing the selector sleeve into centered engagement with either the intermediate gear or the input means.

4. A transmission as defined by claim 3 wherein the input surface of the selector collar comprises a plurality of radially outwardly extending teeth, each tooth having a concave side surface and intervening inwardly extending concave roots, the self centering surface comprises these concave surfaces.

5. A transmission comprising:
an input means for receiving rotary motion, the input means having a first output surface;
a drive shaft for transmitting rotary motion to a work assembly;
a transfer means for transferring rotary motion from the input means to the drive shaft, the transfer means having at least three radially arranged countershaft gears and first and second intermediate gears, each of the counter shaft gears are provided with first and second output surfaces and an input surface, the first output surface is operatively coupled to the first intermediate gear, the second output surface is operatively coupled to the second intermediate gear, and the input surface is operatively coupled to the first output surface of the input means, the first and second intermediate gears and radially supported by the three countershaft gears; and
a gear selector collar slidably positioned on the drive shaft and selectively coupled to either the first or second intermediate gear for selectively coupling the intermediate gears to the drive shaft for transmitting rotary motion from the input means through the transfer means to the drive shaft. the first and second intermediate gears are concentrically arranged around the gear selector collar, both the drive shaft and the gear selector collar have cooperating splines for transmitting rotation between the selected collar and the drive shaft, the selector collar is provided with an input surface which selectively cooperates with the first or second intermediate gears, the input surface of the selector collar is provided with a self centering surface means for biassing the selector sleeve into centered engagement with one of the intermediate gears.

6. A transmission as defined by claim 5 wherein the input surface of the selector collar comprises a plurality of radially outwardly extending teeth, each tooth having a concave side surface and intervening inwardly extending concave roots, the self centering surface comprises these concave surfaces.

7. A transmission comprising:
an input gear for receiving rotary motion, the input gear having a first output surface and a second output surface;
a drive shaft for transmitting rotary motion to a work assembly;
a transfer means for transferring rotary motion from the input gear to the drive shaft, the transfer means having at least three radially arranged countershaft gears and at least one intermediate gear, each of the countershaft gears is provided with a first output surface and an input surface, the first output surface is operatively coupled to the intermediate gear, the input surface is operatively coupled tot he first output surface of the input gear, the input gear and the intermediate gear are radially supported by the three countershaft gears; and
a gear selector collar slidably positioned on the drive shaft for selectively coupling the intermediate gear or the input gear to the drive shaft for transmitting rotary motion from the input means through the transfer means to the drive shaft, the intermediate gear is concentrically arranged around the gear selector collar, both the drive shaft and the gear selector collar have cooperating splines for transmitting rotation between the selected collar and the drive shaft, the selector collar is provided with an input surface which selectively cooperates with the intermediate gear or the input gear, the input surface of the selector collar is provided with a self centering surface means for biassing the selector sleeve into centered engagement with either the intermediate gear or the input gear.

8. A transmission as defined by claim 7 wherein the input surface of the selector collar comprises a plurality of radially outwardly extending teeth, each tooth having a concave side surface and intervening inwardly extending concave roots, the self centering surface comprises these concave surfaces.

* * * * *

UNITED STATES PATENT AND TRADEMARK OFFICE
CERTIFICATE OF CORRECTION

PATENT NO. : 5,076,111

DATED : 31 December 1991

INVENTOR(S) : Mahlon L. Love

It is certified that error appears in the above-identified patent and that said Letters Patent is hereby corrected as shown below:

Column 5, line 19, delete "for"; line 55, delete "surfaces"
    and insert therefor -- surface -- ; line 62, after
    "surface" insert -- means -- .
Column 6, line 13, delete "and" and insert therefor -- are -- ;
    line 37, after "surface" insert -- means -- ;line 52,
    delete "tot he" and insert therefor -- to the -- ;
Column 8, line 3, after "surface" insert -- means -- .

Signed and Sealed this

Sixth Day of April, 1993

*Attest:*

STEPHEN G. KUNIN

*Attesting Officer*   *Acting Commissioner of Patents and Trademarks*